Figure 6:
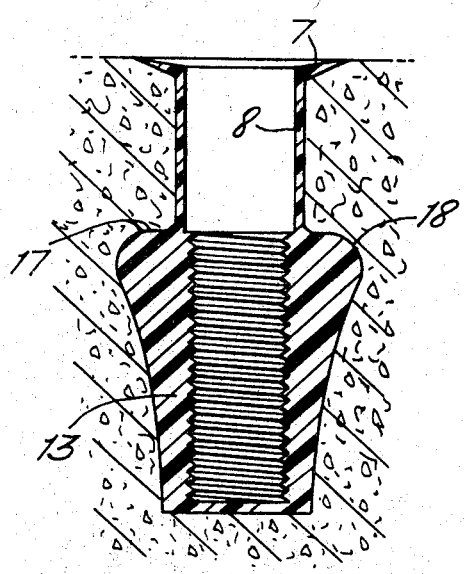

United States Patent

[11] 3,561,307

| [72] | Inventor | Louis Aackersberg Mortensen<br>Kongevejen 35, Birkerod, Denmark |
|---|---|---|
| [21] | Appl. No. | 718,898 |
| [22] | Filed | Apr. 4, 1968 |
| [45] | Patented | Feb. 9, 1971 |
| [32] | Priority | Apr. 5, 1967 |
| [33] | | Denmark |
| [31] | | 1941/67 |

[54] FASTENING DEVICE
9 Claims, 9 Drawing Figs.

[52] U.S. Cl. .................................................. 85/32,
52/707; 151/7
[51] Int. Cl. .................................................. F16b 37/00,
F16b 39/22
[50] Field of Search .................................................. 151/7;
85/32K, 32; 151/41.76, 41.73, 19; 52/707, 704;
85/82, 83, 63

[56] References Cited
UNITED STATES PATENTS

| 2,785,726 | 3/1957 | Brush | 85/83X |
|---|---|---|---|
| 3,200,694 | 8/1965 | Rapata | 85/82 |
| 3,404,596 | 10/1968 | Ryder | 85/82X |
| 1,599,745 | 9/1926 | Cinnamond | 52/704X |
| 1,940,545 | 12/1933 | Holmes | 52/704X |
| 2,793,884 | 5/1957 | Jungblut | 151/7X |
| 2,896,295 | 7/1959 | Fischer | 85/32X |
| 2,904,800 | 9/1959 | Peterson | 85/32X |

FOREIGN PATENTS

| 503,538 | 6/1951 | Belgium | 85/82 |
|---|---|---|---|
| 1,435,643 | 3/1966 | France | 85/82 |
| 1,258,300 | 3/1961 | France | 52/704 |
| 916,813 | 1/1963 | Great Britain | 52/704 |

*Primary Examiner*—Ramon S. Britts
*Attorney*—Nolte and Nolte

ABSTRACT: A plastic mold-in wall plug is provided which has a thin wall tubular section and an adjacent thick wall section having an inner threaded bore whereby when the plug is molded into a cement structure or the like and fastening means are screwed thereinto and tightened, the stress created in the wall plug will be distributed over a large portion of the cement surrounding the wall plug and this distribution will be away from the cement surface thereby eliminating the risk of bursting off a portion of the concrete.

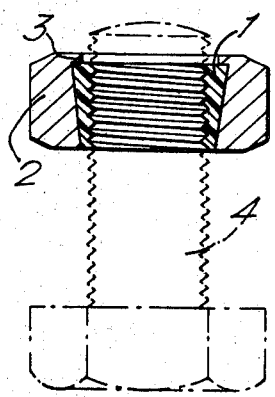
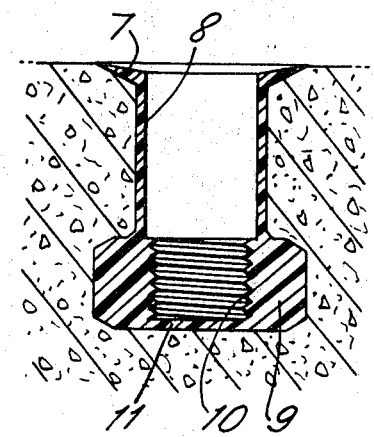
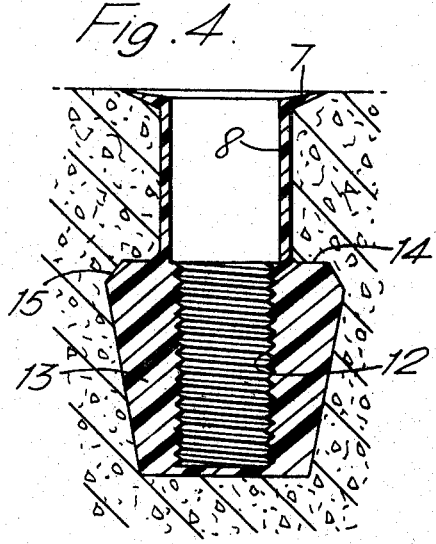
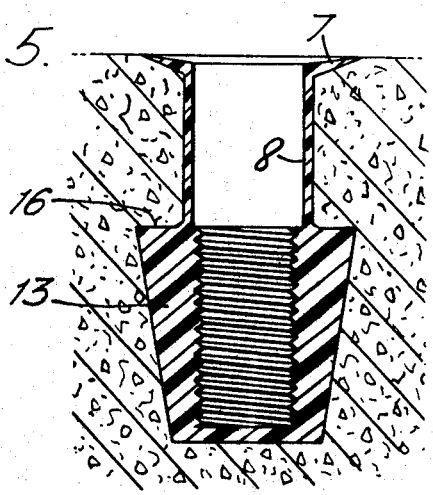

FASTENING DEVICE

The invention relates to a fastening device for use in connection with fastening by means of a screw and being of the type comprising a tubular plastic portion into which the screw is screwed, and which at its outer surface is entirely or partly enveloped in such a manner that the outer surface of the tubular plastic portion is substantially prevented from expanding.

There is known an expansion plug with an inner part that has a conical outer surface, and with an outer part having a conical inner surface, the inner part consisting of plastic. The plug is inserted in a hole and the two parts are displaced axially in relation to each other by means of a screw in the inner part. Hereby the outer part will expand and it will exert an inwards directed radial pressure on the inner part. Hereby the outer part will expand and it will exert an inwards directed radial pressure on the inner part. Hereby there may be obtained a very strong screw thread in the inner part, as the screw thread is compressed around the screw.

An object of the invention is to devise a fastening device of the type indicated by means of which there may be obtained a very strong screw thread without it being necessary to carry out a displacement whereby it is obtained that the fastening device may be put to other uses than expansion plugs. The characteristic feature of the fastening device according to the invention is that the tubular plastic portion is tightly enveloped by harder material. It has turned out that thereby there may be obtained a very considerable strength.

The tubular plastic portion may, according to the invention, be made in the form of a mold-in wall plug with projecting members for retainment in concrete. By molding the plug into concrete the concrete portion will closely envelop the tubular plastic portion so that its outer surface is prevented from expanding. Hereby there is obtained a very considerable strength of retainment. Such a mold-in plug is cheap to make and prevents corrosion of the screw that is screwed into it.

The tubular plastic portion may, according to the invention, be enveloped by a circumferential metal portion. Also in this case it is prevented that the outer surface expands and there is obtained a retainment with considerable strength.

The tubular plastic portion and the metal portion may, according to the invention, be made in the form of a nut. Thereby there is obtained a nut with good retainment strength, there being no risk of the screw rusting fast or being shaken loose.

According to the invention the fastening device may be made in such a manner that the tubular plastic portion has a conical outer surface, and that the metal portion has a corresponding conical inner surface. Such a fastening device is employed in the manner that the tension is exerted in the direction towards the narrow end of the plastic portion so that there is obtained a particularly effective compression of the plastic material around the screw.

The tubular plastic portion may, according to the invention, consist of hard material, and it may have an inner screw thread. Also in this case the enveloping material should be harder. Thereby there is obtained a very strong retainment.

The tubular plastic portion may, according to the invention, consist of soft material. In this case there is employed a screw that can expand the inner portions of the plastic portion. Also in this case there is obtained a very strong retainment. The plastic portion may be made without an inner screw thread, and a screw with a coarse screw thread may be used, for instance a so-called wood screw.

In the drawings there are shown some embodiments of a fastening device according to the invention, FIG. 1 showing an axial section through a nut, FIG. 2 an axial section through another embodiment of a nut, FIGS. 3—9 axial sections through seven different embodiments of a mold-in wall plug.

The nut shown in FIG. 1 consists of an inner tubular plastic portion 1 and an outer portion 2 of iron or another hard nonresilient material. The inner portion 1 has an inner cylindrical screw thread and a conical outer surface. The outer portion 2 has a corresponding conical inner surface while its outer surface may be polygonal, for instance hexagonal. At the broad end of the inner part 1 the outer part 2 has a retaining edge 3 to retain the inner portion 1. When using the nut shown in FIG. 1 it is provided for that the tension is directed towards the cone apex as indicated by means of a screw 4. If the tension becomes so large that a slight axial displacement of the plastic portion 1 takes place in relation to the outer portion 2 the plastic portion 1 will be compressed somewhat and will be clamped around the screw thread of the screw 4.

The nut shown in FIG. 2 consists of a piece of tube 5 of hard nonresilient material, for instance iron, and of an inner tubular plastic portion 6. The portion 5 may for instance be made by cutting through a tube of iron with a suitable polygonal profile, for instance a hexagonal profile. The plastic portion 6 has an inner screw thread. It may be injection molded separately and inserted in the piece of tube 5. However, it will also be possible to mold it directly in the piece of tube 5. The ends of the piece of tube 5 are bent inwards to retain the plastic portion.

The mold-in wall plug shown in FIG. 3 for molding into concrete has a flange 7, a tubular piece 8 with a smooth inner surface, and an expanded piece 9 having an inner screw thread 10. The plug is closed by means of an end wall 11. When the plug is molded into concrete the outer surface of the piece 9 will be prevented from expanding, and by screwing a screw into the screw thread 10 there is therefore obtained a screw connection with great tensile strength. The screw is protected against rusting fast and against being shaken loose. The plug may have suitable ribs to prevent it from turning in the concrete portion. The sharp-edged flange 7 can entail a good tightening against the mold surface in question during the molding.

The mold-in wall plug shown in FIG. 4 has a flange 7 and a tubular piece 8 as the plug shown in FIG. 3. A screw thread 12 is made in a portion with an outer conical surface. The transition between said portion and the piece 8 is formed by a plane shoulder 14 and a narrow conical surface 15. The conical portion 13 may on its outer surface have relatively deep longitudinally extending grooves.

The mold-in wall plug shown in FIG. 5 corresponds essentially to the one shown in FIG. 4, but the transition between the conical portion 13 and the piece of tube 8 is formed by a plane shoulder 16.

The mold-in wall plug shown in FIG. 6 also corresponds essentially to the one shown in FIG. 4, but the transition between the conical portion 13 and the piece of tube 8 is formed by a plane shoulder and a curvature 18.

Figure 7:
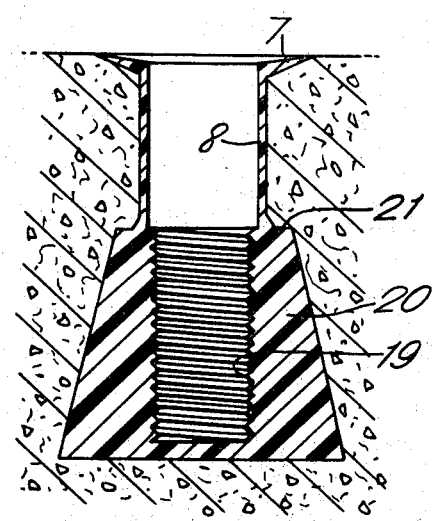

The mold-in wall plug shown in FIG. 7 also has a flange 7 and a piece of tube 8. An inner screw thread 19 is made in a portion 20 with a conical outer surface, the conicity of which is opposite the conicity shown in FIGS. 4—6. The transition between the conical portion 20 and the piece of tube 8 is formed by a narrow shoulder 21.

Figure 8:
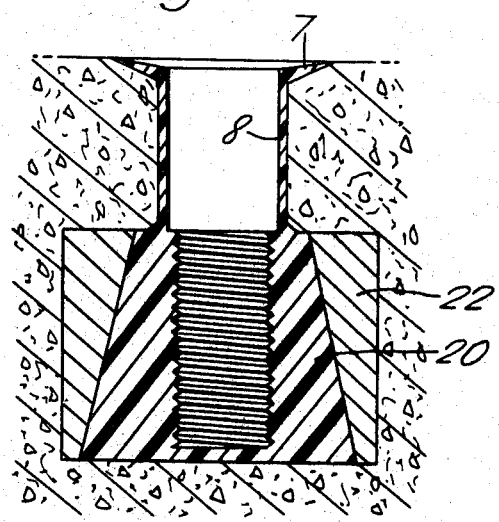

The mold-in wall plug shown in FIG. 8 has a plastic portion essentially as the one shown in FIG. 7, and on the conical portion 20 there is placed an iron plug 22 having an inner conical surface corresponding to the outer surface of the conical portion 20, and it has a cylindrical outer surface.

Figure 9:
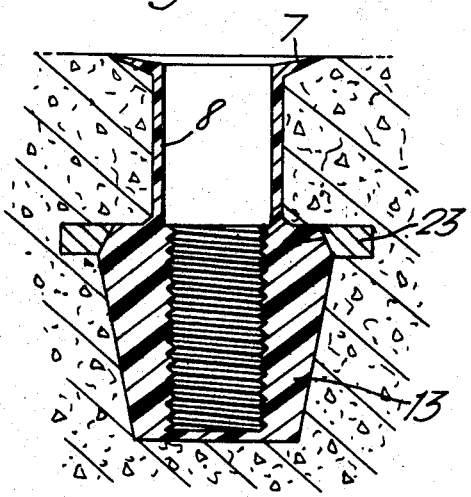

The mold-in wall plug shown in FIG. 9 has a plastic portion essentially as shown in FIG. 4, and an iron ring 23 is arranged on the oblique surface 15.

The mold-in plugs shown in FIGS. 4—9 are used in the same manner as the mold-in plug shown in FIG. 3.

The shown and described embodiments are only to be considered by way of example as several variations are conceivable within the scope of the invention.

I claim:

1. A one piece synthetic plastic mold-in wall plug comprising an elongated thin walled axially rigid tubular section having a smooth inner surface, an adjacent thick walled section having an inner internally threaded bore, said thin walled and said thick walled sections both defining circumferentially continuous surfaces, said thick walled section being connected to said thin walled section and the axis of said tubular member and the axis of said bore being substantially coaxial, the thickness of said thick walled section, for at least a portion of its length, being substantially greater than the thickness of said tubular section, and said thick walled section for at least a portion of its length extending radially outwardly beyond said thin walled section, whereby said thick walled section comprising means for preventing the removal of the plug when it is molded into a cement structure and whereby when the plug is molded into a cement structure or the like and fastening means are screwed thereinto and tightened, the stress created in the thick walled section will be distributed at a substantial distance from the surface of the wall over a relatively large portion of the cement surrounding said section and in directions throughout a large angular range.

2. A wall plug according to claim 1 wherein said thick wall section has a substantially conical exterior surface tapering inwardly away from said tubular section and has a shoulder portion extending between said tubular section and said conical surface.

3. A wall plug according to claim 2, wherein said thick walled section shoulder is planar and extends substantially in the radial direction.

4. A wall plug according to claim 3, further comprising a metallic section having an inner conical surface adjacently surrounding said conical surface.

5. A wall plug according to claim 2, wherein said shoulder portion is curvilinear.

6. A wall plug according to claim 2, wherein said shoulder comprises a planar portion extending radially outwardly from said tubular section and a second conical section tapering outwardly away from said tubular section joining said planar portion to said first conical section.

7. A wall plug according to claim 6 including a metallic ring having an interior conical surface adjacent said shoulder conical surface.

8. A wall plug according to claim 1 wherein said thick wall section has a conical exterior surface tapering outwardly away from said tubular section.

9. A one-piece synthetic mold-in wall plug comprising an elongated thin walled axially rigid tubular section having a smooth inner surface, an adjacent thick walled section having an inner internally threaded bore, said thin walled and said thick walled sections both defining circumferentially continuous surfaces, said thick walled section being connected to said thin walled section and the axis of said tubular member and the axis of said bore being substantially coaxial, the thickness of said thick walled section, for at least a portion of its length, being substantially greater than the thickness of said tubular section, said thick walled section having a substantially conical exterior surface tapering inwardly away from said tubular section and having an external shoulder portion extending between said tubular section and said conical surface, and a metallic section having an inner conical surface adjacently surrounding at least a portion of said thick walled conical surface.